(12) United States Patent
Tomiyama

(10) Patent No.: US 10,941,677 B2
(45) Date of Patent: Mar. 9, 2021

(54) POWER PLANT AND POWER OUTPUT INCREASE CONTROLLING METHOD FOR POWER PLANT

(71) Applicant: Mitsubishi Power, Ltd., Yokohama (JP)

(72) Inventor: Tomoya Tomiyama, Yokohama (JP)

(73) Assignee: Mitsubishi Power, Ltd., Yokohama (JP)

( * ) Notice: Subject to any disclaimer, the term of this patent is extended or adjusted under 35 U.S.C. 154(b) by 0 days.

(21) Appl. No.: 16/700,142

(22) Filed: Dec. 2, 2019

(65) Prior Publication Data

US 2020/0308991 A1 Oct. 1, 2020

(30) Foreign Application Priority Data

Mar. 28, 2019 (JP) .............................. JP2019-063120

(51) Int. Cl.
| | |
|---|---|
| *F01K 13/02* | (2006.01) |
| *F01K 7/40* | (2006.01) |
| *F01K 7/38* | (2006.01) |
| *F01K 17/02* | (2006.01) |
| *F01K 17/06* | (2006.01) |

(52) U.S. Cl.
CPC ................ *F01K 13/02* (2013.01); *F01K 7/38* (2013.01); *F01K 7/40* (2013.01); *F01K 17/02* (2013.01); *F01K 17/06* (2013.01)

(58) Field of Classification Search
CPC . F01K 13/02; F01K 7/40; F01K 17/02; F01K 17/06; F01K 7/38
USPC ........................... 60/653, 654, 663, 677–678
See application file for complete search history.

(56) References Cited

U.S. PATENT DOCUMENTS

| | | | | |
|---|---|---|---|---|
| 3,965,675 A | * | 6/1976 | Martz | ................... F01K 23/108 60/39.182 |
| 3,998,058 A | * | 12/1976 | Park | ........................ F01D 21/02 60/652 |
| 4,651,533 A | * | 3/1987 | Ura | ........................... F01K 7/40 60/678 |

(Continued)

FOREIGN PATENT DOCUMENTS

| | | |
|---|---|---|
| DE | 10 2012 000 029 A1 | 7/2013 |
| EP | 2 660 511 A1 | 11/2013 |

(Continued)

OTHER PUBLICATIONS

Extended European Search Report issued in European Application No. 19213127.4 dated Jul. 27, 2020 (seven (7) pages).

(Continued)

*Primary Examiner* — Hoang M Nguyen
(74) *Attorney, Agent, or Firm* — Crowell & Moring LLP

(57) ABSTRACT

A power plant comprises a boiler, a turbine, a condenser, a feed water heater, a deaerator, a deaerator water level control valve, an extraction system which introduces the steam extracted from the turbine into the feed water heater, an extraction valve, an auxiliary steam introduction system which introduces auxiliary steam into the feed water heater, an auxiliary steam control valve and a control device. When a rapid load increase request is made, the control device controls, to orient the extraction valve in a closing direction, to maintain an opening of the deaerator water level control valve, and to orient the auxiliary steam control valve in an opening direction.

8 Claims, 1 Drawing Sheet

(56) References Cited

U.S. PATENT DOCUMENTS

2014/0208752 A1* 7/2014 Palanisamy ............. F01K 3/004
                                                    60/648
2015/0167499 A1* 6/2015 Shinozaki ............... F22B 1/028
                                                    60/641.8

FOREIGN PATENT DOCUMENTS

| JP | 2013-53531 A | 3/2013 |
| JP | 2018-162739 A | 10/2018 |
| JP | 2018-189007 A | 11/2018 |
| WO | WO 2011/104759 A1 | 9/2011 |

OTHER PUBLICATIONS

Korean language Office Action issued in Korean Application No. 10-1019-0160351 dated Dec. 13, 2020 with English translation (10 pages).

Hindi-language Office Action issued in Indian Application No. 201914049713 dated Dec. 30, 2020 with English translation (five (5) pages).

* cited by examiner

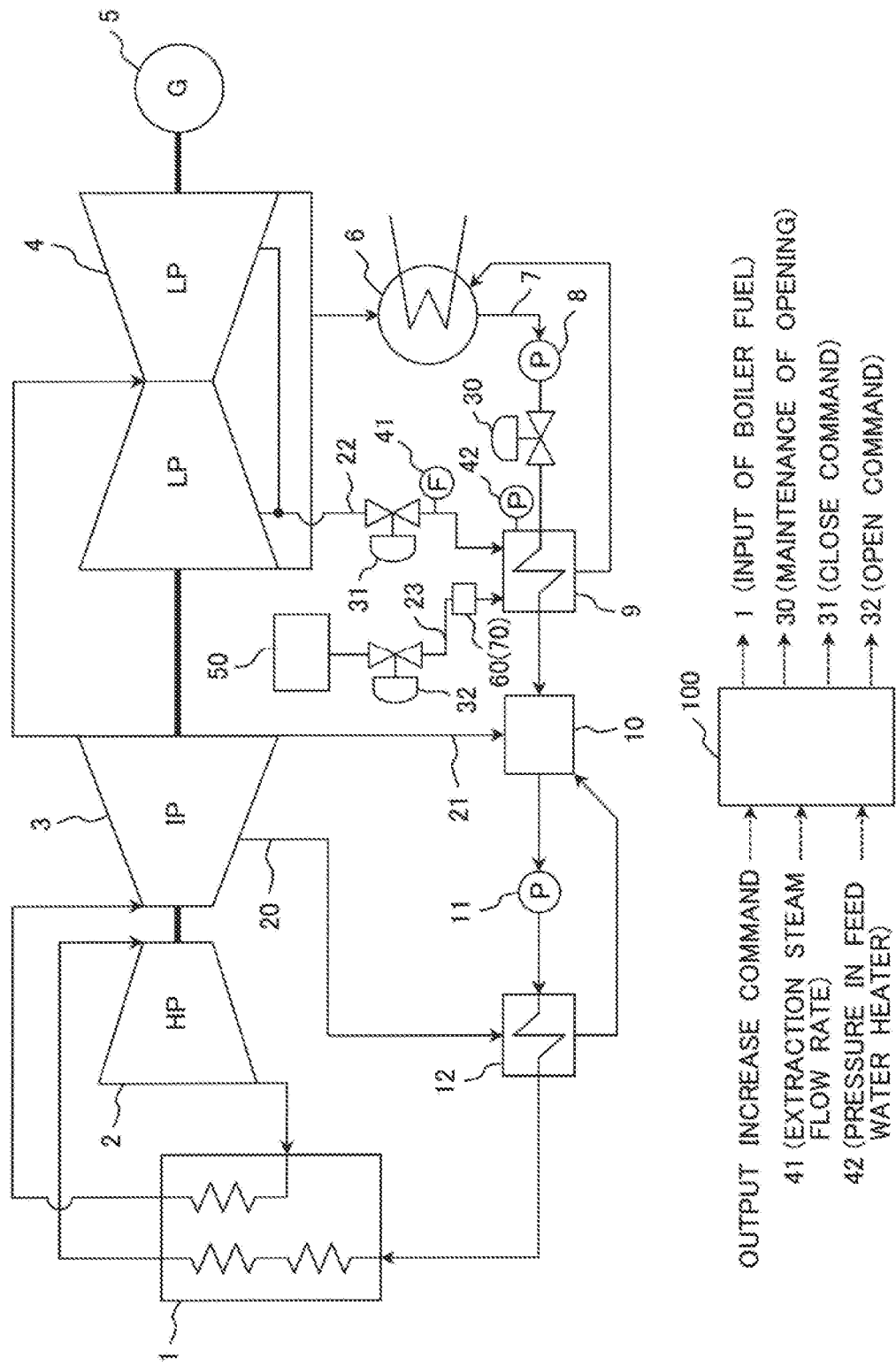

POWER PLANT AND POWER OUTPUT INCREASE CONTROLLING METHOD FOR POWER PLANT

CLAIM OF PRIORITY

The present application claims priority from Japanese Patent application serial No. 2019-63120, filed on Mar. 28, 2019, the content of which is hereby incorporated by reference into this application.

TECHNICAL FIELD

The present invention relates to a power plant and a power output increase controlling method for the power plant.

BACKGROUND OF THE INVENTION

There is proposed a controlling system which is called condensate throttling operation control in which an extraction valve and a deaerator water level control valve are closed at a fixed speed until fixed openings are attained so as to temporarily increase power generation output in response to a request to rapidly increase a load on the power generation output of the power plant (see, for example, Japanese Unexamined Patent Application No. 2013-53531).

SUMMARY OF THE INVENTION

In the condensate throttling operation control, since the deaerator water level control valve is controlled to be closed, a flow rate of the condensate on the downstream side of the deaerator water level control valve is temporarily is reduced and a water level of the deaerator is lowered accordingly. Therefore, it is necessary to install a deaerator which has a capacity sufficient to cover lowering of the water level, and installation of the deaerator causes such a problem that an equipment cost is required.

In addition, it is necessary to install a condensate storage tank (Cold Condensate Storage Tank: in the following, referred to as CCST) which is adapted to temporarily store the condensate on the upstream side of the deaerator water level control valve in order to avoid water level raising in a condenser due to controlling to close the deaerator water level control valve and installation of the CCST becomes a factor for a further increase in equipment cost.

The present invention aims to provide a power plant which is capable of making installation of the CCST unnecessary or of reducing a capacity of the CCST or does not depend on the capacity of the deaerator when increasing the power generation output of the power plant, and a power output increase controlling method for the power plant.

According to one aspect of the present invention, there is provided a power plant which includes a steam generation device, a turbine which is driven with stream generated by the steam generation device, a condenser which condenses the steam exhausted from the turbine, a feed water heater which heats condensate whose pressure is risen by a condensate pump, a deaerator which heats and de-aerates the condensate heated by the feed water heater, a deaerator water level control valve which controls a water level of the deaerator, an extraction system which introduces the steam extracted from the turbine into the feed water heater, an extraction valve which is installed in the extraction system, an auxiliary steam introduction system which introduces auxiliary steam into the feed water heater, and an auxiliary steam control valve which is installed in the auxiliary steam introduction system and controls an amount of steam supplied to the feed water heater, in which a control is performed so as to orient the extraction valve in a closing direction, to maintain an opening of the deaerator water level control valve, and to orient the auxiliary steam control valve in an opening direction when a rapid load increase request is made.

According to the present invention, it becomes possible to make installation of the CCST unnecessary or to reduce the capacity of the CCST when increasing the power generation output of the power plant. In addition, it becomes possible to realize an increase in power generation output which does not depend on the capacity of the deaerator. As a result, it becomes possible to suppress an increase in equipment cost.

Issues, configurations and effects other than the above will become apparent from the following description of embodiments of the present invention.

BRIEF DESCRIPTION OF THE DRAWINGS

FIG. 1 is a diagram illustrating one configuration example of a power plant according to one embodiment of the present invention.

DETAILED DESCRIPTION

In the following, embodiments of the present invention will be described in detail with reference to the drawing.

FIG. 1 is a diagram illustrating one configuration example of a power plant according to one embodiment of the present invention. Incidentally, in FIG. 1, illustration of valves such as a main steam valve and so forth and other auxiliary machinery such as a desalting device and so forth is omitted.

The power plant (a steam turbine power generation facility) is configured by a boiler (a steam generation device) 1, a high-pressure turbine 2 which is driven with main steam sent from the boiler 1, an intermediate-pressure turbine 3 which is driven with reheat steam obtained by reheating steam exhausted from the high-pressure turbine 2 by the boiler 1, a low-pressure turbine 4 which is driven with steam exhausted from the intermediate-pressure turbine 3, and a generator 5 which is driven by the high-pressure turbine 2, the intermediate-pressure turbine 3, and the low-pressure turbine 4. In addition, the power plant includes a condensate/feedwater system which is configured by a condenser 6, a condensate pump 8, a low-pressure feed water heater 9, a deaerator 10, a feed pump 11, a high-pressure feed water heater 12, and so forth.

Extracted steam sent from the low-pressure turbine 4 is supplied to the low-pressure feed water heater 9 via a low-pressure extraction piping 22. Incidentally, although only one low-pressure feed water heater 9 is illustrated in FIG. 1, a plurality of the low-pressure feed water heaters 9 are installed as needed. In addition, there are cases where extracted steam sent from the intermediate-pressure turbine 3 is supplied to the low-pressure feed water heater 9 located on the rear-stage side.

Extracted steam sent from the intermediate-pressure turbine 3 is supplied to the deaerator 10 via a second high-pressure extraction piping 21. There are cases where the extracted steam is supplied to the deaerator 10 via a first high-pressure extraction piping 20 which has an extraction position on the upstream side of the intermediate-pressure turbine 3.

The extracted steam is supplied to the high-pressure feed water heater 12 via the first high-pressure extraction piping 20 which has the extraction position on the upstream side of the intermediate-pressure turbine 3. Incidentally, although only one high-pressure feed water heater 12 is illustrated in FIG. 1, a plurality of the high-pressure feed water heaters 12 are installed as needed. In addition, there are cases where extracted steam sent from the high-pressure turbine 2 is supplied to the high-pressure feed water heater 12 located on the rear-stage side.

A deaerator water level control valve 30 which controls a water level of the deaerator 10 is installed in a condensate system located on the upstream side of the deaerator 10. In the present embodiment, the deaerator water level control valve 30 is installed in a condensate piping 7 located on the downstream side of the condensate pump 8. In addition, an extraction valve 31 which isolates the steam extracted from the low-pressure turbine 4 or controls an amount of the extracted steam is installed in the low-pressure extraction piping 22.

In the present embodiment, further, an auxiliary stream introduction system which introduces auxiliary steam into the low-pressure feed water heater 9 is installed. The auxiliary steam introduction system includes an auxiliary steam source 50 such as a house boiler and an auxiliary steam supply pipe 23 which introduces steam sent from the auxiliary steam source 50 into the low-pressure feed water heater 9, and an auxiliary steam control valve 32 which controls an amount of steam supplied to the low-pressure feed water heater 9 is installed in the auxiliary steam supply pipe 23. The house boiler is used for generation of steam used for driving a feed pump driving turbine, steam used for cooling a steam turbine, steam used for starting the deaerator 10, and so forth and is superior to the boiler 1 in mobility.

In addition, in the present embodiment, a flowmeter 41 which measures an extracted steam amount is installed on the low-pressure extraction piping 22, and a pressure gauge 42 which measures a pressure in the low-pressure feed water heater 9 is installed on the low-pressure feed water heater 9.

Then, in the present embodiment, there is provided a control device 100 which receives a power output increase command signal, signals which are sent from the flowmeter 41 and the pressure gauge 42 and so forth as input signals and outputs a fuel input command signal to be sent to the boiler 1 and opening command signals and so forth to be sent to the deaerator water level control valve 30, the extraction valve 31, and the auxiliary steam control valve 32.

Next, one embodiment of a power output increase controlling method for the power plant in the present invention will be described.

In a case where a rapid load increase request is made to the power plant, the power plant which is configured as described above is controlled by a method which will be described in the following so as to cope with a rapid power generation output increase request until a boiler load is risen.

For example, in a case where a reduction in system frequency occurs in a power system, a 3%-power output increase command is output from a central power feed command station and so forth to the control device 100 of the power plant.

The control device 100 receives the 3%-power output increase command and then outputs a close command to the extraction valve 31 and outputs an open command to the auxiliary steam control valve 32. Incidentally, in this instance, in related-art condensate throttling operation control, neither the close command nor the open command is output to the deaerator water level control valve to which the close command is already output so as to maintain the opening at that time point. Further, in this instance, the control device 100 outputs a boiler fuel input command to the boiler 1 so as to increase an amount of fuel and to increase an amount of steam generated from the boiler 1.

The power generation output is increased by increasing a subsequent-stage flow rate of the steam in the low-pressure turbine 4 by the amount that the extraction flow rate is reduced by controlling to close the extraction valve 31 (the 3% increase in power generation output is attained).

An increase command is output to the boiler 1 so as to increase a flow rate of feed water in order to increase the amount of steam generated from the boiler 1. In the related art condensate throttling operation control, the flow rate of the condensate which enters the deaerator is reduced by tightening the deaerator water level control valve. On the other hand, a feed water flow rate increase command is issued and thereby the flow rate of feed water pumped to the boiler by the feed pump from the deaerator is increased. As a result, in the related art condensate throttling operation control, an unbalance occurs between the amount (increase) of feed water which flows out of the deaerator and the amount (decrease) of the condensate which flows into the deaerator and the water level of the deaerator is lowered. Therefore, in the related art, installation of the deaerator which has a capacity sufficient to cover lowering of the water level becomes necessary and thus the equipment cost is required.

In the present embodiment, since the deaerator water level control valve 30 is in a state of maintaining its opening, the water level of the deaerator 10 is not lowered. Accordingly, it is not necessary to increase the capacity of the deaerator 10 when increasing the power generation output. That is, it is possible to realize the power generation output increase which does not depend on the capacity of the deaerator 10. In addition, even when the extraction valve 31 is closed, the auxiliary steam control valve 32 is controlled to be opened so as to supply the auxiliary steam to the low-pressure feed water heater 9, and therefore it becomes possible to perform necessary feed water heating.

According to the embodiments of the present invention, it becomes unnecessary to control the deaerator water level control valve 30 to be closed while an operation of coping with the rapid load increase request is being performed, and water levels of the deaerator 10 and the condenser 6 cease to change by maintaining the flow rate of the condensate which flows into the low-pressure feed water heater 9 constant. Therefore, it becomes possible to make installation of the CCST unnecessary and to reduce the capacity of the deaerator 10.

When the boiler generated steam reaches an amount which makes the 3% power output increase possible in the boiler 1, performance of the operation of coping with the rapid load increase request is terminated. Specifically, opening command signals are output from the control device 100 to the extraction valve 31 and the auxiliary steam control valve 32 so as to return the opening of the extraction valve 31 to the usual state and to close the auxiliary steam control valve 32.

Incidentally, it is desirable to control the opening of the auxiliary steam control valve 32 on the basis of a flow rate signal sent from the flowmeter 41 so as to fill up the extracted steam amount reduced by a closing operation of the extraction valve 31.

In addition, it is desirable to control the opening of the auxiliary steam control valve 32 on the basis of a pressure signal sent from the pressure gauge 42 so as to fill up the pressure in the low-pressure feed water heater 9 which drops by the closing operation of the extraction valve 31.

In addition, it is desirable to install a desuperheater 60 or a pressure reducer 70 on the auxiliary steam supply pipe 23 so as to match a temperature or a pressure of the auxiliary steam sent from the auxiliary steam source 50 with a temperature or a pressure of the extracted steam.

Incidentally, the present invention is not limited to the above-described embodiments, and various modified examples are included. For example, the abovementioned embodiments have been described in detail in order to comprehensibly describe the present invention and are not necessarily limited to those which possess all the above-described configurations. In addition, it is possible to replace part of a configuration of one embodiment with a configuration of another embodiment, and it is also possible to add the configuration of another embodiment to the configuration of one embodiment. Further, it is also possible to add, delete, and replace another configuration to, from, and with part of one configuration of each embodiment.

LIST OF REFERENCE SIGNS

1 . . . boiler, 2 . . . high-pressure turbine, 3 . . . intermediate-pressure turbine, 4 . . . low-pressure turbine, 5 . . . generator, 6 . . . condenser, 7 . . . condensate piping, 8 . . . condensate pump, 9 . . . feed water heater (low-pressure feed water heater), 10 . . . deaerator, 11 . . . feed pump, 12 . . . high-pressure feed water heater, 20 . . . first high-pressure extraction piping, 21 . . . second high-pressure extraction piping, 22 . . . low-pressure extraction piping, 23 . . . auxiliary steam supply pipe, 30 . . . deaerator water level control valve, 31 . . . extraction valve, 32 . . . auxiliary steam control valve, 41 . . . flowmeter, 42 . . . pressure gauge, 50 . . . auxiliary steam source, 60 . . . desuperheater, 70 . . . pressure reducer, and 100 . . . control device.

What is claimed is:

1. A power plant, comprising:
a steam generation device;
a turbine which is driven with stream generated by the steam generation device;
a condenser which condenses the steam exhausted from the turbine;
a feed water heater which heats condensate whose pressure is risen by a condensate pump;
a deaerator which heats and de-aerates the condensate heated by the feed water heater;
a deaerator water level control valve which controls a water level of the deaerator;
an extraction system which introduces the steam extracted from the turbine into the feed water heater;
an extraction valve installed in the extraction system;
an auxiliary steam introduction system which introduces auxiliary steam into the feed water heater;
an auxiliary steam control valve which is installed in the auxiliary steam introduction system and controls an amount of steam supplied to the feed water heater; and
a control device which outputs opening command signals to the deaerator water level control valve, the extraction valve, and the auxiliary steam control valve,
wherein the control device controls to orient the extraction valve in a closing direction, controls to maintain an opening of the deaerator water level control valve, and controls to orient the auxiliary steam control valve in an opening direction in a case where a rapid load increase request is made to the power plant.

2. The power plant according to claim 1, wherein a desuperheater for the auxiliary steam is installed in an auxiliary steam supply pipe of the auxiliary steam introduction system.

3. The power plant according to claim 1, wherein a pressure reducer for the auxiliary steam is installed in an auxiliary steam supply pipe of the auxiliary steam introduction system.

4. The power plant according to claim 1, further comprising a pressure gauge which is configured to measure a pressure in the feed water heater, and
wherein the control device controls an opening of the auxiliary steam control valve with the pressure in the feed water heater set as a control index.

5. The power plant according to claim 1, further comprising a flowmeter which is configured to measure a flow rate of extracted steam which flows in the extraction system, and
wherein the control device controls an opening of the auxiliary steam control valve with the flow rate of the extracted steam set as a control index.

6. A power output increase controlling method for a power plant which includes a steam generation device, a turbine which is driven with stream generated by the steam generation device, a condenser which condenses the steam exhausted from the turbine, a feed water heater which heats condensate water whose pressure is risen by a condensate pump, a deaerator which heats and de-aerates the condensate heated by the feed water heater, a deaerator water level control valve which controls a water level of the deaerator, an extraction system which introduces the steam extracted from the turbine into the feed water heater, an extraction valve which is installed in the extraction system, an auxiliary steam introduction system which introduces auxiliary steam into the feed water heater, and an auxiliary steam control valve which is installed in the auxiliary steam introduction system and controls an amount of steam supplied to the feed water heater, comprising the step of controlling to orient the extraction valve in a closing direction, controlling to maintain an opening of the deaerator water level control valve, and controlling to orient the auxiliary steam control valve in an opening direction in a case where a rapid load increase request is made to the power plant.

7. The power output increase controlling method for the power plant according to claim 6, further comprising the steps of:
measuring a pressure in the feed water heater; and
controlling an opening of the auxiliary steam control valve with the pressure in the feed water heater set as a control index.

8. The power output increase controlling method for the power plant according to claim 6, further comprising the steps of:
measuring a flow rate of extracted steam which flows in the extraction system; and
controlling an opening of the auxiliary steam control valve with the flow rate of the extracted steam set as a control index.

* * * * *